No. 692,823. Patented Feb. 11, 1902.
H. BREMER.
MEANS FOR EXTRACTING JUICE FROM RAW MEAT, &c.
(Application filed Sept. 12, 1900.)
(No Model.)
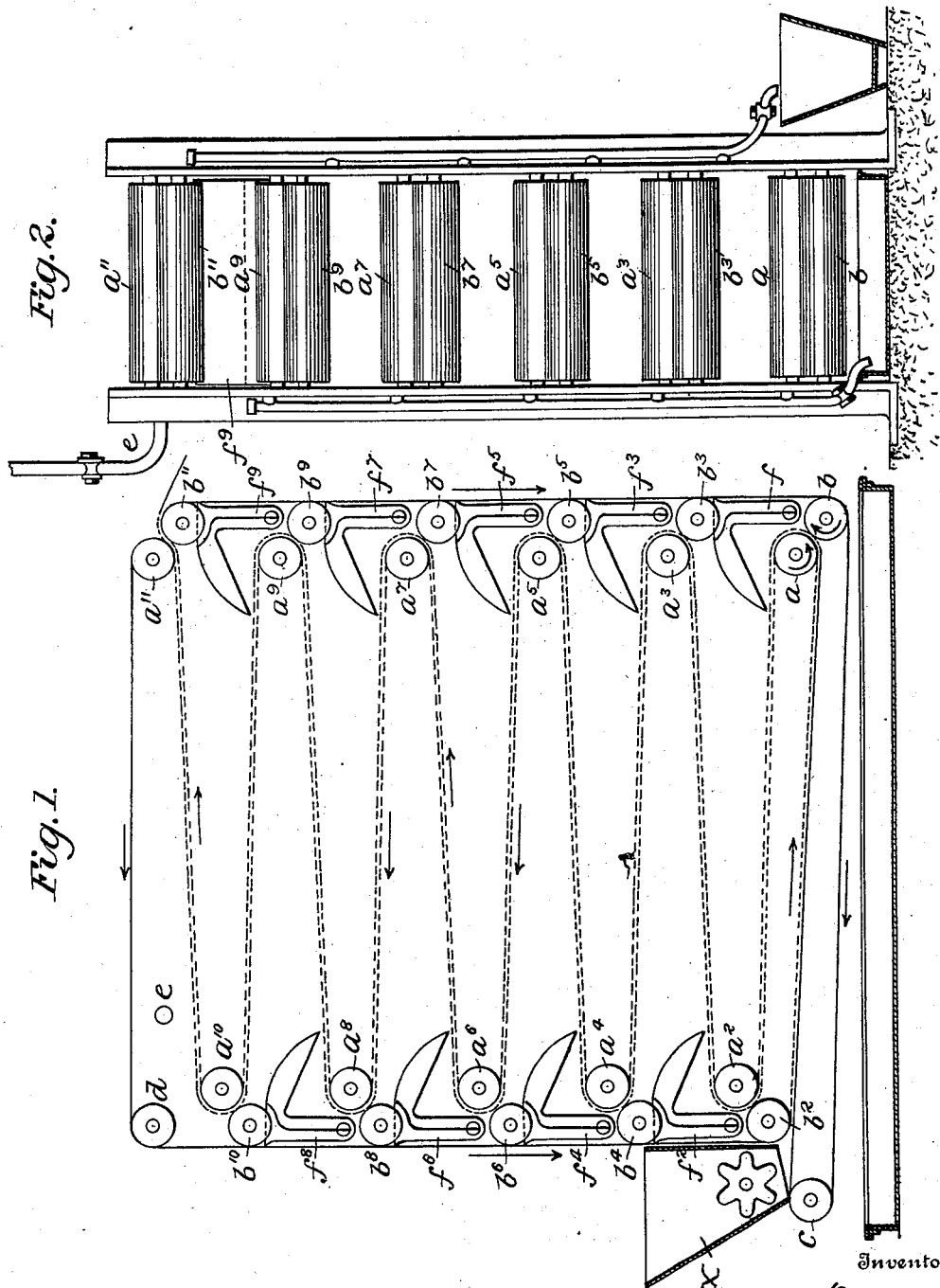
Inventor
Hermann Bremer
Witnesses
By ........... Attorneys

UNITED STATES PATENT OFFICE.

HERMANN BREMER, OF MUNICH, GERMANY.

MEANS FOR EXTRACTING JUICE FROM RAW MEAT, &c.

SPECIFICATION forming part of Letters Patent No. 692,823, dated February 11, 1902.

Application filed September 12, 1900. Serial No. 29,817. (No model.)

*To all whom it may concern:*

Be it known that I, HERMANN BREMER, a subject of the Emperor of Germany, and a resident of Munich, Bavaria, Germany, have invented certain new and useful Improvements in Means for Extracting, of which the following is a specification.

This invention relates to the extraction of the extract or juice from raw meat and to preparing extracts from other substances.

According to this invention the substance from which the extract is to be made is delivered between two endless aprons which travel upwardly in a zigzag path, they passing over opposite tiers of guide-rollers arranged one above the other. The material from which the extract is to be obtained is fed at the lower portion of the aprons and is compressed between the said aprons by means of pressure-rollers pressing against the guide-rollers. The water or other liquid required for extraction is supplied to the aprons at their highest part, so that the liquid while it possesses the highest power of absorption acts upon the portion of the substance under treatment from which the greatest amount of extract has already been removed, while the part of the liquid richest in extract acts upon the portion of the substance which is richest in matter to be extracted. The advantages of this process are that it admits of continuous extraction, that it requires a comparatively small amount of extraction liquid, and that the most perfect and remunerative extracting effect is secured. As for the purposes of this process comparatively little extracting liquid is needed, the matter extracted takes the form of a solution of a relatively high degree of concentration, the subsequent evaporation of which involves the consumption of far less fuel than has been required hitherto in dealing with solutions obtained by periodical extraction.

My invention is more fully described in the accompanying specification and drawings, in which—

Figure 1 is a side view of the apparatus, and Fig. 2 is an end view of the same.

In the drawings an arrangement of apparatus fitted for the purposes of this process—say for the extraction of the juice of raw meat—is represented in side and in front elevation. On each side of suitable framework are rollers $a\, a^2\, a^3\, a^4\, a^5\, a^6\, a^7\, a^8\, a^9\, a^{10}\, a^{11}$, mounted in fixed bearings, and in proximity to each of these rollers is a pressure-roller $b\, b^2\, b^3\, b^4\, b^5\, b^6\, b^7\, b^8\, b^9\, b^{10}\, b^{11}$, mounted in sliding bearings, so that the intermediate space between the pairs of rollers $a$ and $b$ is adjustable. Over the first-named rollers are conducted two endless aprons, which are stretched by means of tension-rollers $c$ and $d$, supported by adjustable bearings.

The meat from which the extract is to be obtained is delivered into the machine at $x$ at the lower part, so that it passes between the aprons, extraction-water being admitted to the aprons through a pipe $e$ at the upper part of the apparatus. The rollers are so rotated that the aprons travel in a zigzag upward direction and in so doing carry up the meat interposed between them from the charging and lower end $x$ to the discharging and upper end $y$. The extraction-water flows from the pipe $e$ onto the aprons, running from $a^{10}$ to $a^{11}$, and at first it serves to subject the meat from which most of the extract has already been removed to a final or exhaustive extracting process, the liquid being expressed from such meat and falling into receivers $f\, f^2\, f^3\, f^4\, f^5\, f^6\, f^7\, f^8\, f^9$, which separate the fat from the extract. These receivers each contain a partition which compels the liquid at first to descend to the bottom and then to rise on the other side and to flow through an outlet-channel provided for the purpose onto the portion of the aprons beneath the fat, which comes onto the surface in the first portion of the receiver, being discharged through a pipe provided at the top thereof, so that the extract alone is delivered onto the aprons. The meat held between the aprons thus undergoes extraction as it moves upward, being pressed between the aprons by the rollers at each side, the extract falling into the receivers and then onto the portions of the aprons beneath, so that the liquid becomes more and more rich in extracted matter as it approaches the lower part of the apparatus, while more and more of the valuable matter is extracted from the meat as it approaches the upper part of the apparatus. The pure water having the maximum absorbing power is consequently made to act at the top upon the part of the meat poorest in matter to be extracted, while below the liquid richest in such matter acts upon the richest part of the meat. It will therefore be understood that by means of these opposite currents extraction is effected rapidly and perfectly, while this mode of operation has the additional advantage of being continuous, and thereby avoiding the tedious discharging and replenishing operations which the usual periodical extractors entail and which lead to both waste of time and loss of material.

For emptying the receivers $f$, which act as fat-separators, upon the close of operations each of the said receivers is provided at its lowest end with discharge-cocks.

To accelerate extraction, the rollers over which the aprons pass may be hollow and be heated by steam or hot water or air.

To prevent any of the meat from being forced out from between the two aprons, the charge of meat admitted should not be allowed to spread over the entire width of the said aprons; but the meat upon the first lengths of the aprons should be arranged in a comparatively narrow and thick layer, which by passing through the successive pairs of rollers will gradually become thinner and wider until on reaching the topmost portions of the aprons the meat is thinly spread over the whole width of the aprons, to effect which object the pressure-rollers should rest in sliding or adjustable bearings, permitting the depth of the layer of meat to be gradually varied.

It will be understood that the apparatus will serve for preparing extracts from other substances than meat and will admit of the employment of any extracting medium that may be preferred. Where such medium is of a volatile nature, (benzin, for example,) the apparatus is inclosed in an air-tight case having the necessary inlets and outlets for the substance from which the extract is to be obtained and for the extracting medium, respectively, fitted with adequate means for tightly closing them. This apparatus may also be used to considerable advantage for fractional extraction by admitting various extracting fluids at different levels of the apparatus and discharging them after they have performed their extracting action through a channel specially provided for the purpose.

I claim—

1. In an apparatus for obtaining meat or other extracts, the combination of guide-rollers arranged one above the other in opposite tiers, endless aprons passing in a zigzag course over said rollers, means for feeding the material to be extracted to the aprons at their lower ends, pressure-rollers arranged in proximity to the guide-rollers, means for supplying extracting fluid at the upper part of the endless aprons, and means for receiving the expressed extract, substantially as set forth.

2. In an apparatus for obtaining meat or other extracts, the combination of hollow guide-rollers arranged one above the other in opposite tiers, endless aprons passing in a zigzag course over said rollers, means for feeding the material to be extracted to the aprons at their lower ends, hollow pressure-rollers arranged in proximity to the guide-rollers, means for heating the guide and pressure rollers, means for supplying extracting fluid at the upper part of the endless aprons, and means for receiving the expressed extract, substantially as set forth.

3. In an apparatus for extracting meat or other extracts, the combination of guide-rollers arranged one above the other in opposite tiers, endless aprons passing in a zigzag course over said rollers, means for feeding the material to be extracted to the aprons at their lower ends, hollow pressure-rollers arranged in proximity to the guide-rollers and means for heating the same, means for supplying extracting fluid at the upper part of the endless aprons, and means for receiving the expressed extract, substantially as set forth.

4. In an apparatus for obtaining meat or other extracts, the combination of a frame, guide-rollers arranged one above the other in opposite tiers on either side of the frame, two endless aprons carried upwardly side by side in a zigzag course over said guide-rollers, means for feeding the material to be extracted between the aprons at their lower ends, adjustably-mounted pressure-rollers arranged in proximity to each of the guide-rollers, means for supplying extracting fluid at the upper part of the endless aprons, and means for receiving the expressed extract, substantially as set forth.

5. In an apparatus for obtaining meat or other extracts, the combination of guide-rollers arranged one above the other in opposite series, endless aprons passing in a zigzag course over said rollers, means for feeding the material to be extracted to the aprons at their lower ends, a pressure-roller arranged in proximity to each guide-roller, means for supplying extracting fluid at the upper part of the endless aprons, and a receptacle beneath each pair of guide and pressure rollers divided by a partition extending nearly to the bottom thereof into two compartments, one provided with an outlet for fat and the other with a channel for the discharge of the extract from which the fat has been removed, substantially as set forth.

In testimony whereof I have signed my name to this specification in the presence of two subscribing witnesses.

HERMANN BREMER.

Witnesses:
MAX WILDE,
LUDWIG GERET.